US012416402B1

(12) United States Patent
Popov

(10) Patent No.: US 12,416,402 B1
(45) Date of Patent: Sep. 16, 2025

(54) SEAMLESS LIGHT SYSTEM FOR THRESHOLDS, CABINETS, AND BASEBOARDS

(71) Applicant: Teliee Popov, Lititz, PA (US)

(72) Inventor: Teliee Popov, Lititz, PA (US)

( * ) Notice: Subject to any disclaimer, the term of this patent is extended or adjusted under 35 U.S.C. 154(b) by 0 days.

(21) Appl. No.: 18/919,026

(22) Filed: Oct. 17, 2024

(51) Int. Cl.
*F21V 33/00* (2006.01)
*F21S 4/28* (2016.01)
*F21V 23/00* (2015.01)
*F21W 131/301* (2006.01)
*F21Y 105/12* (2016.01)

(52) U.S. Cl.
CPC ............ *F21V 33/0016* (2013.01); *F21S 4/28* (2016.01); *F21V 23/002* (2013.01); *F21W 2131/301* (2013.01); *F21Y 2105/12* (2016.08)

(58) Field of Classification Search
CPC ...... F21V 33/0016; F21V 23/002; F21S 4/28; F21Y 2105/12; F21W 2131/301
See application file for complete search history.

(56) References Cited

U.S. PATENT DOCUMENTS

| | | | | |
|---|---|---|---|---|
| 4,872,095 A * | 10/1989 | Dubak | F21V 23/0442 362/802 |
| 7,916,019 B2 * | 3/2011 | Vial | H01H 3/161 340/687 |
| 9,163,428 B1 * | 10/2015 | Fare | E05B 17/10 |
| 9,677,756 B1 * | 6/2017 | Johnson | B44C 5/005 |
| 10,670,259 B2 | 6/2020 | Krijn et al. | |
| 10,785,852 B1 * | 9/2020 | Stubbs | H05B 47/115 |
| 2007/0241259 A1 | 10/2007 | Pandorf et al. | |
| 2022/0263297 A1 * | 8/2022 | Bodurka | E05B 47/00 |

FOREIGN PATENT DOCUMENTS

JP 2001262955 A 9/2001

* cited by examiner

*Primary Examiner* — Zheng Song

(57) ABSTRACT

A lighting system integrated into a door and adjacent baseboard which provides a seamless light between the door and baseboard. Multiple lighted strips integrated into channels within the door and baseboard provide a concealed lighting system. By utilizing a concealed hinge, retractable conduit, and light spacing, the lighting system provides a consistent illumination.

20 Claims, 9 Drawing Sheets

SEAMLESS LIGHT SYSTEM FOR THRESHOLDS, CABINETS, AND BASEBOARDS

FIELD OF THE INVENTION

The present invention relates generally to light fixtures. More specifically, the present invention is a lighting fixture for providing consistent illumination beneath doors, baseboards, and cabinets.

BACKGROUND OF THE INVENTION

In modern interior design, lighting plays a crucial role not only in providing illumination but also in enhancing the aesthetic appeal of spaces. As architectural designs evolve, there is a growing demand for innovative lighting solutions that integrate seamlessly with interior elements, such as doors and baseboards, to create cohesive and visually appealing environments. Traditional lighting systems often focus on illuminating specific areas of a room, such as ceilings, walls, or floors. However, the junction between doors and baseboards remains an underutilized space for lighting applications.

The prior art typically involves lighting systems that illuminate specific sections of a room, but these systems often fail to address the junction between the bottom edge of a door and the adjacent baseboard. As a result, gaps in illumination can occur, disrupting the visual continuity and flow of lighting across the room. Some solutions in the prior art integrate lighting into baseboards or door frames, but these often lack the ability to provide continuous illumination across the gap. Additionally, such systems frequently require multiple power sources, which increases the complexity of installation and maintenance.

The prior art fails to provide a mechanism that allows for seamless lighting across the door-baseboard gap, which leads to interruptions in lighting and detracts from the aesthetic value of the space. In environments that prioritize design continuity and minimalism, the inability of the prior art to address these issues is particularly problematic.

The present invention addresses the shortcomings of the prior art by providing a lighting system that delivers seamless, continuous illumination between the bottom edge of a door and the adjacent baseboard. The present invention features a baseboard with a protrusion, wherein a light strip is positioned on the bottom-facing surface of the protrusion. This configuration allows the light to illuminate the space directly above the floor, creating a smooth and uninterrupted lighting effect.

The present invention further includes a concealed hinge and a retractable conduit that links the light strip on the baseboard to a corresponding light strip on the bottom edge of the door. The retractable conduit ensures that the lighting connection is maintained as the door moves, thereby providing consistent illumination across the gap between the door and the baseboard. This retractable conduit allows the light strips to remain at a consistent distance from one another, regardless of the door's position, ensuring continuous lighting without any gaps.

A key advantage of the present invention is its ability to operate using a single power source. The retractable conduit houses the necessary wiring that connects the baseboard light strip with the door light strip, eliminating the need for separate power sources. By utilizing a single power source, the present invention simplifies the installation process, reduces energy consumption, and enhances overall system efficiency. This centralized power system also minimizes the risk of power supply failures that could otherwise disrupt the lighting.

The present invention solves the problems associated with the prior art by offering a streamlined solution for maintaining seamless lighting across the door and baseboard junction. By integrating the light strips on both the baseboard and door and linking them via a retractable conduit, the present invention ensures continuous illumination.

Additionally, the present invention's single power source configuration significantly reduces the complexity found in the prior art, where multiple power sources are often required to operate separate lighting elements. The present invention not only simplifies the electrical setup but also contributes to energy savings and ease of maintenance. This feature makes it an ideal solution for modern interiors that demand both functionality and aesthetic appeal.

In summary, the present invention provides a lighting system that addresses the limitations of the prior art. It offers seamless and consistent illumination between the bottom edge of a door and the adjacent baseboard, utilizing a concealed hinge, a retractable conduit, and a single power source. This innovative system enhances both the aesthetic and functional aspects of interior lighting, making it a practical and efficient solution for modern interior environments

DETAIL DESCRIPTIONS OF THE INVENTION

Figure 1:
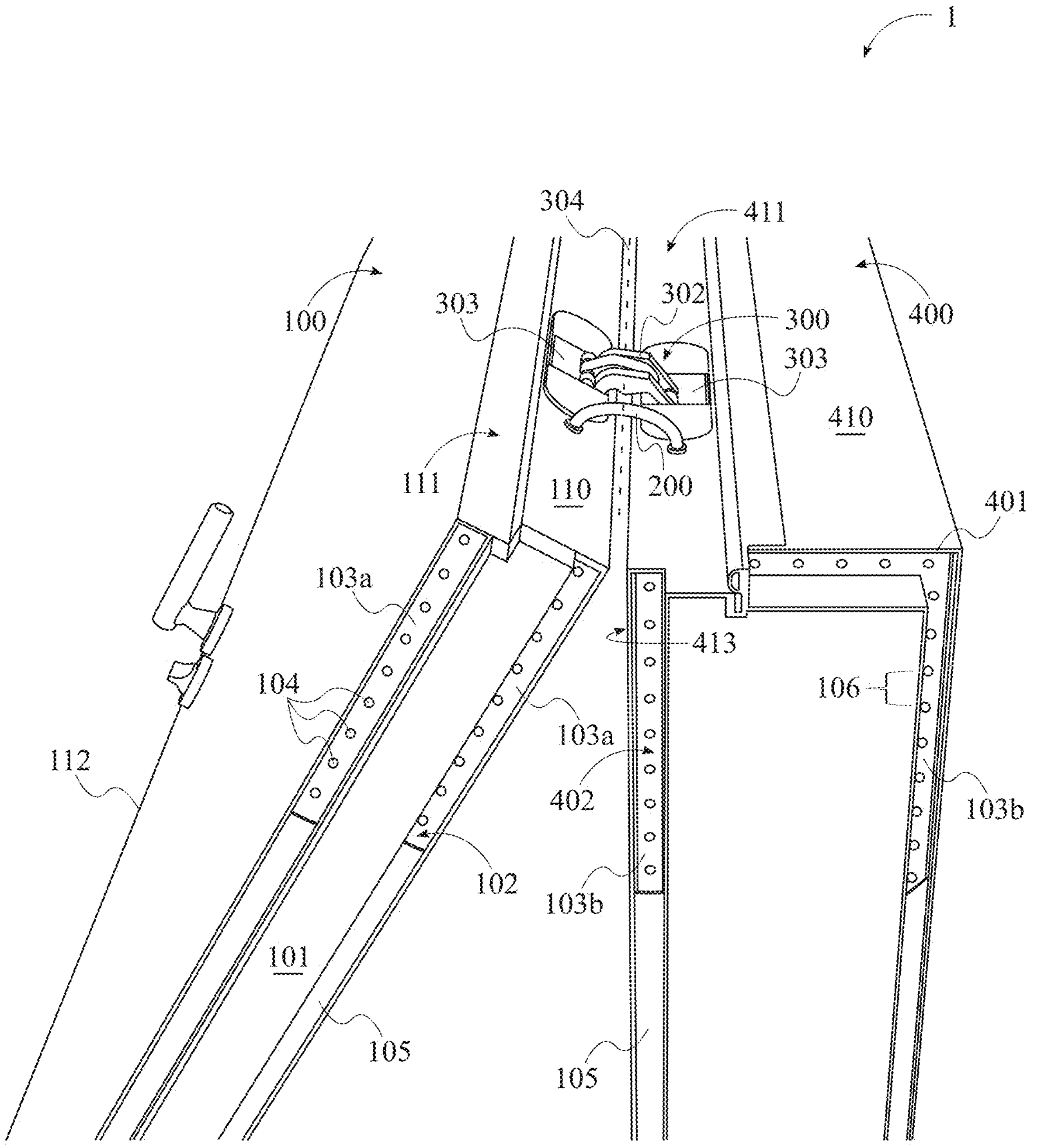
FIG. 1 is a bottom perspective view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a lighting system 1, embodiments of the present disclosure are not limited to use only in this context.

As shown in FIG. 1, the present invention is a lighting system 1 comprising a door 100, a baseboard 400, and a plurality of lighted strips 103 (composed of 103*a* and 103*b*). In the context of the present invention, the door 100 is hingedly engaged to the baseboard 400, by which the door 100 hinges along an axis of rotation 304 in relation to the baseboard 400. In the context of the present invention, the baseboard 400 is defined as an adjacent member by which the door 100 hinges about. In the context of the invention, the baseboard 400, as disclosed herein, may further comprise a cabinet comprising a hinged door; in such a context, the cabinet is considered the baseboard 400. Furthermore, in the context of the present invention, the baseboard 400 may further be referred to herein as its ordinary definition being a member traversing along the lowest part of an interior wall, specifically positioned at the junction of the floor board and the wall. In the preferred embodiment of the present invention, a plurality of lighted strips 103 traverse each of: the door 100 and the baseboard 400.

In the preferred embodiment of the present invention, as shown in FIG. 1, the door 100 comprises a downwardly facing surface 101, a channel 102, a proximal edge 110, and a distal edge 112. Within the context of the present invention, the downwardly surface 101 of the door 100 is understood as being the portion of the door 100 that engages with a threshold of a doorway. In the preferred embodiment of the present invention, as shown in FIG. 1, the channel 102 is a recess traversing along the downwardly facing surface 101 of the door 100. In the preferred embodiment of the present invention, the channel 102 traverses along the downwardly facing surface 101 of the door 100 from the distal end 112 to the proximal end 110. In the context of the present invention, the distal end 112 and the proximal end 110 are opposing ends of the door 100, known within the art as the portions of the door 100 that engage with the vertical portions of a door frame (the jamb). In the context of the present invention, the proximal edge 110 of the door 100 refers to the end that is hingedly connected to the baseboard 400, wherein the distal end 112 is the opposing end, typically known within the art as the portion of the door 100 comprising a latch. Furthermore, within the preferred embodiment of the present invention, the proximal edge 110 of the door 100 comprises a cutout 111. In the preferred embodiment of the present invention, the door 100 comprises two channels 102 traversing both sides of the door (front side and rear side). In the preferred embodiment of the present invention, the lighted strip 103 comprising a plurality of lights 104, traverses the entirety of each channel 102. In some embodiments of the present invention, the channel 102 further comprises a diffuser 105, positioned beneath the lighted strip 104, thereby diffusing the light emitted from the lighted strip 104, creating a consistently "smooth" illumination pattern.

As further shown in FIG. 1, in the preferred embodiment of the present invention, the baseboard 400 comprises an overhang 401 and an interior portion 410. In the context of the present invention, the overhang 401 traverses horizontally about the baseboard 400 wherein an the overhang 401 composes a downwardly facing surface above the floor. In the preferred embodiment of the present invention, the overhang 401 comprises a channel 402 wherein the channel 402 is a recess traversing the entirety of the overhang 401. In the preferred embodiment of the present invention, the lighted strip 103 is inset into the channel 402, traversing the entirety of the channel 402. In some embodiments of the present invention, the channel 402 of the overhang 401 also comprises a diffuser 105. In the context of the present invention, the channel 402 of the overhang 401 horizontally traverses the entirety of the overhang 401 from the interior portion 410 of the baseboard 400. In the context of the present invention, the interior portion 410 of the baseboard 400 is the portion of the baseboard 400 that is hingedly coupled to the proximal edge 110 of the door 100. In the preferred embodiment of the present invention, the interior portion 410 of the baseboard 400 comprises a cutout 411 wherein the cutout 111 of the door 100 and the cutout 411 of the baseboard 400 are complimentary.

Figure 2:
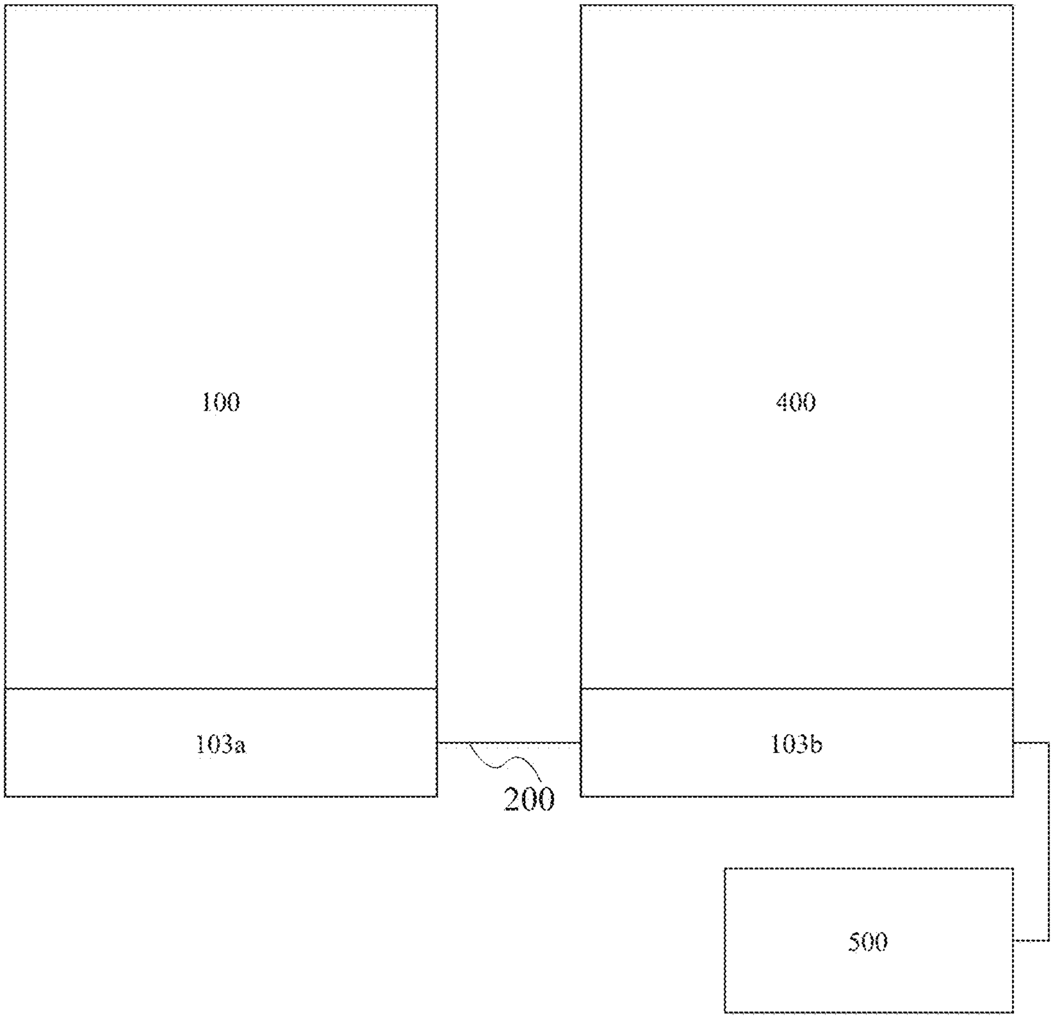
FIG. 2 is an electronic diagram of the present invention.

Additionally, as also shown in FIG. 1, in the preferred embodiment of the present invention, the lighting system 1 further comprises a conduit 200 and a hinge 300. In the context of the present invention, the conduit 200 is a freely retractable sheath that communicates electricity between the plurality of lighted strips 103. Furthermore, the hinge 300, in the preferred embodiment, is a hidden hinge comprising a hinge member 302 and a cavity 303. In the context of the present invention, the hinge member 302 is coupled to each of the door 100 and the baseboard 400, whereby the cavity 303 is a recess cut into both the door 100 and the baseboard 400, wherein the hinge member 302 moves freely within the cavity 303 enabling hinged motion about the axis of rotation 304. As shown in FIG. 2, the conduit 200 communicates electricity, generated from a power source 500, between the door 100 and the baseboard 400. In the preferred embodiment of the present invention the power source is a 12V converter box.

Figure 3:
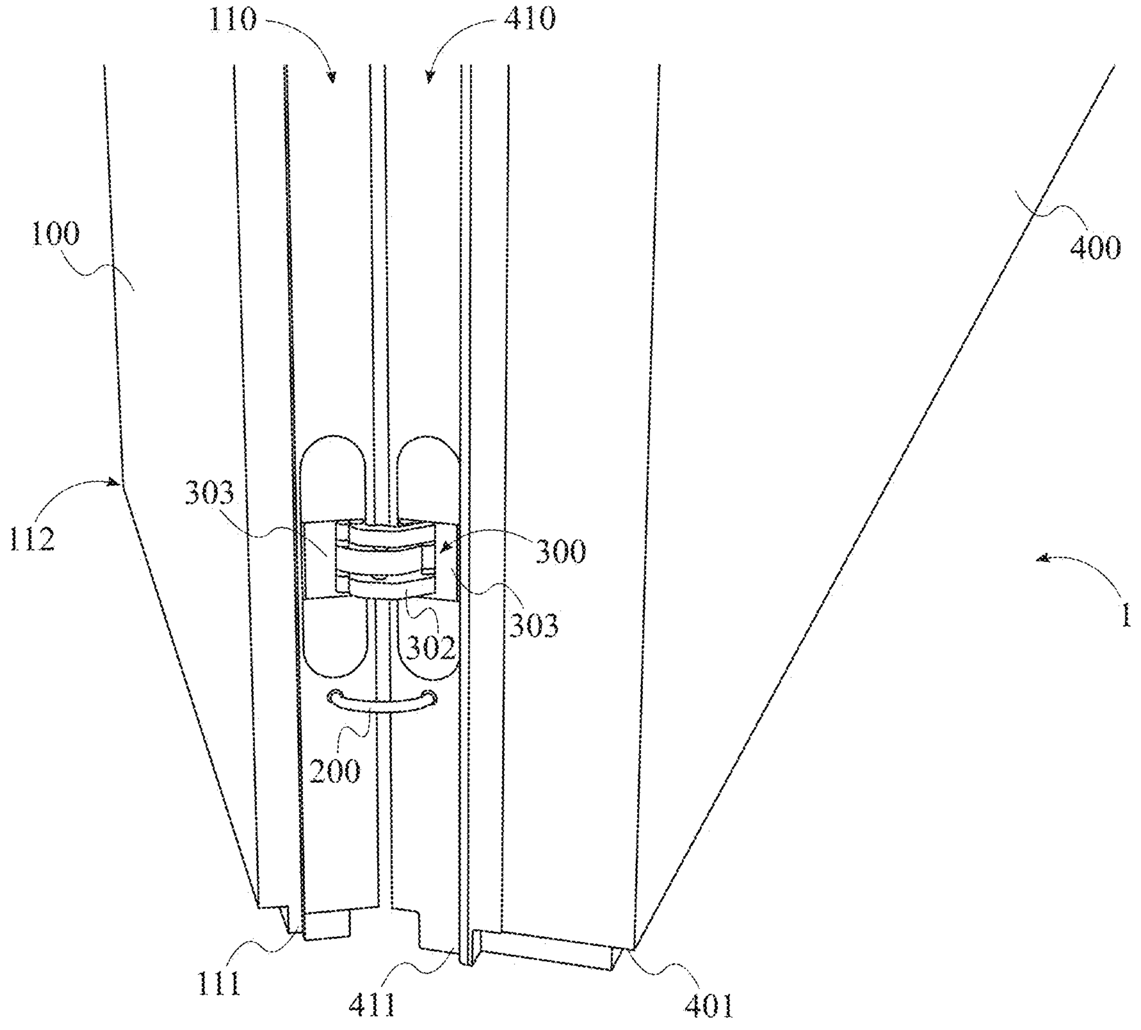
FIG. 3 is a perspective view of the present invention.
Figure 4:
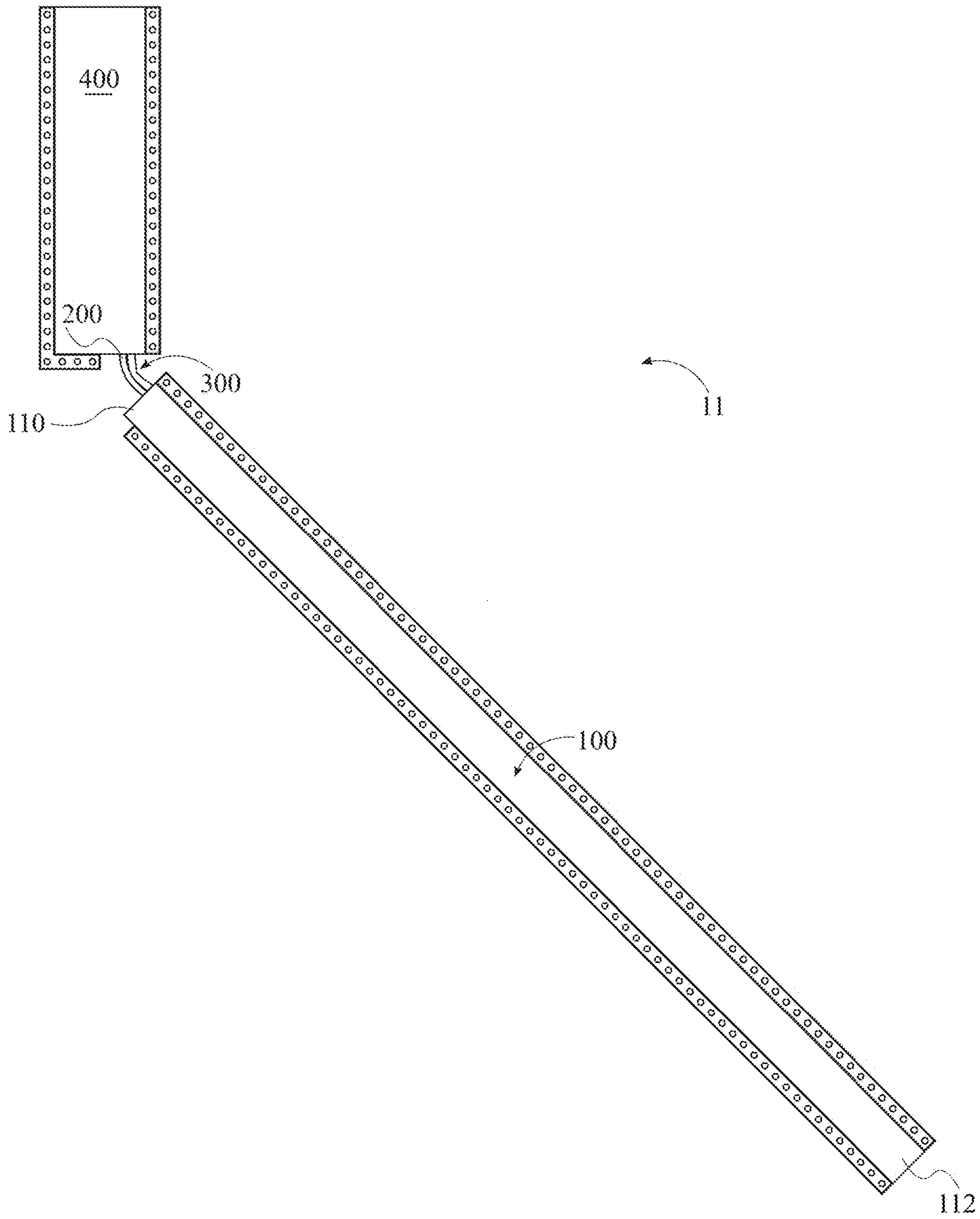
FIG. 4 is a bottom plan view of the present invention in the open configuration.
Figure 5:
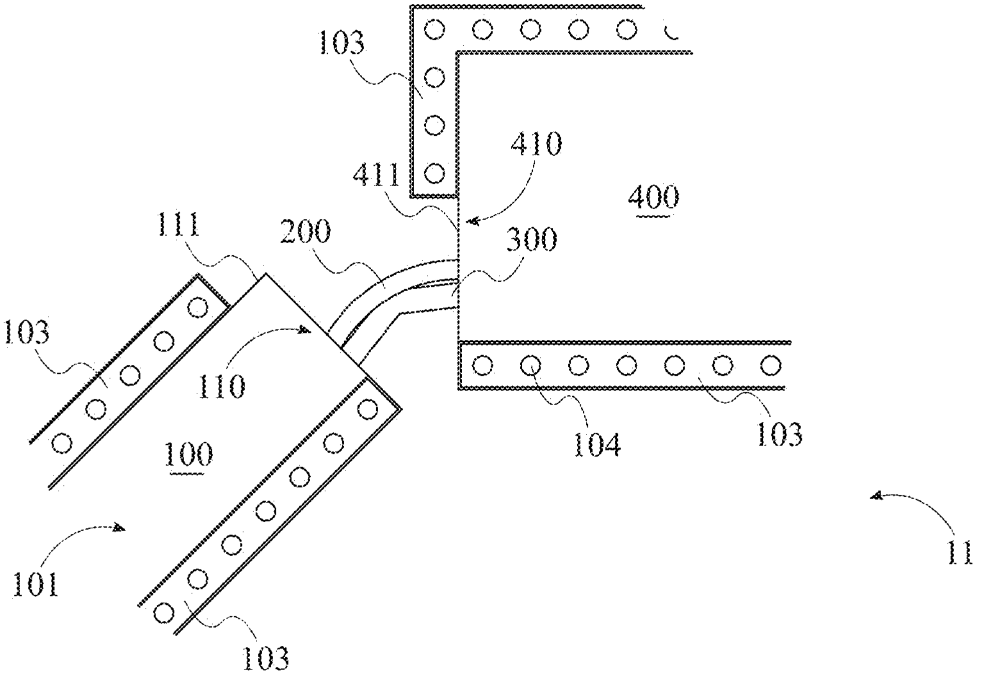
FIG. 5 is a detail bottom plan view of the present invention in the open configuration.

In the preferred embodiment of the present invention, as shown in FIG. 3, the hinge 300 and the conduit 200 are positioned on the proximal end 110 of the door 100 and the interior portion 410 of the baseboard 400, thereby engaging said proximal end 110 and interior portion 410 with each other upon hinged motion. In the preferred embodiment, as shown in FIG. 4, FIG. 5, FIG. 6, and FIG. 7, the present invention comprises an open configuration 11 and a closed configuration 12. In the context of the present invention, the open configuration 11, as understood by those in the art, is defined as a position when the door is opened; wherein the closed configuration 12 is defined as the position when the door is fully closed. In the context of the present invention, when in the open configuration 11, as shown in FIG. 4 and FIG. 5, the conduit 200 and the hinge 300 are exposed in between the proximal edge 110 of the door 100 and the interior portion 410 of the baseboard 400.

Figure 6:
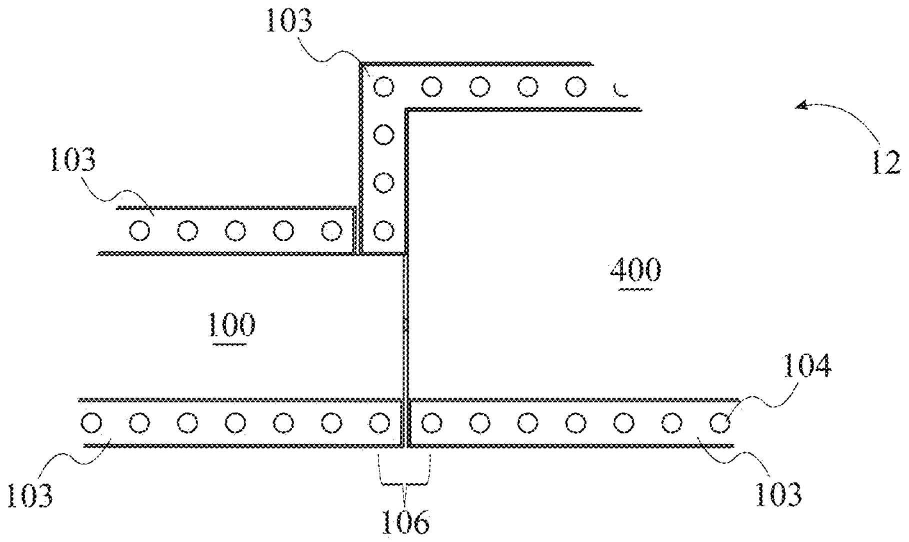
FIG. 6 is a bottom detail view of the proximal edge of the door of the present invention in the closed configuration.
Figure 7:
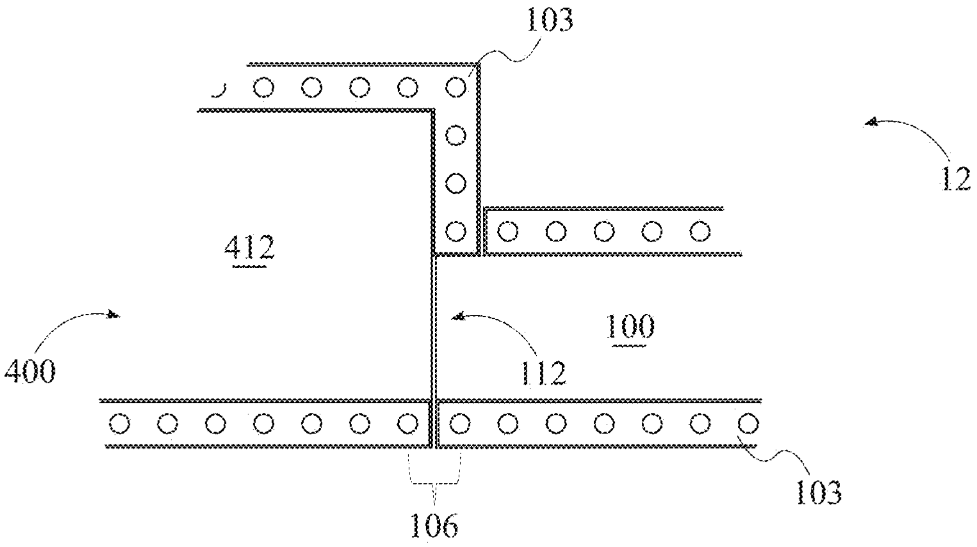
FIG. 7 is a bottom detail view of the distal edge of the door of the present invention in the closed configuration.

As shown in FIG. 6 and FIG. 7, in the closed configuration 12, the hinge mechanism 302 withdraws into the cavity 303; and the conduit 200 withdraws into the door 100 and the baseboard 400. Furthermore, in the closed configuration 12, the lighted strips 103 traversing the channel 102 of the door 100 and the lighted strips 130 traversing the channel 402 of the overhang 401 are directly, also referred to as "immediately," adjacent to each other. In the context of the present invention, "directly adjacent" and "immediately adjacent" are defined as a distance between adjacent lights 106 between the plurality of lights is less than or equal to the distance between adjacent lights 106 on one of the plurality of lighted strips, even between the door 100 and the baseboard 400. For example, the distance between the closest lights 106, adjacent to each other on the door 100 and the baseboard 400, is less than or equal to the distance between two adjacent lights 106 on the lighted strip 103*a* traversing the channel 102 of the door 100 itself. In the context of the present invention, the retractable functionality of the hinge 300 and the conduit 200 provide a mechanism for the plurality of lighted strips 103 to be immediately adjacent to each other. Moreover, in the preferred embodiment of the present invention, the complimentary cutouts 111,411, engage each other when in the closed configuration, thus proving a seemingly continuous lighted strip between the proximal end 110 of the door 100 and the interior portion 410 of the baseboard 400. In the preferred embodiment of the present invention, the baseboard 400 further comprises a door frame 412 wherein the distal portion 112 of the door 100 engages with the door frame 412. In the context of the present invention, the door frame 412 is also referred to as a jamb. Similarly to the plurality of lighted strips 103 between the proximal edge 110 of the door 100 and the interior portion 410 of the baseboard 400, in the preferred embodiment of the present invention, while in the closed configuration 12, the distal edge 112 of the door 100 is directly adjacent to the door frame 412 of the base board 400, thus aligning the plurality of lighted strips 103 on the door 100 and the baseboard 400, specifically the door frame 412, colinearly whereby each of the plurality of lighted strips 103 are immediately adjacent to each other.

Figure 8:
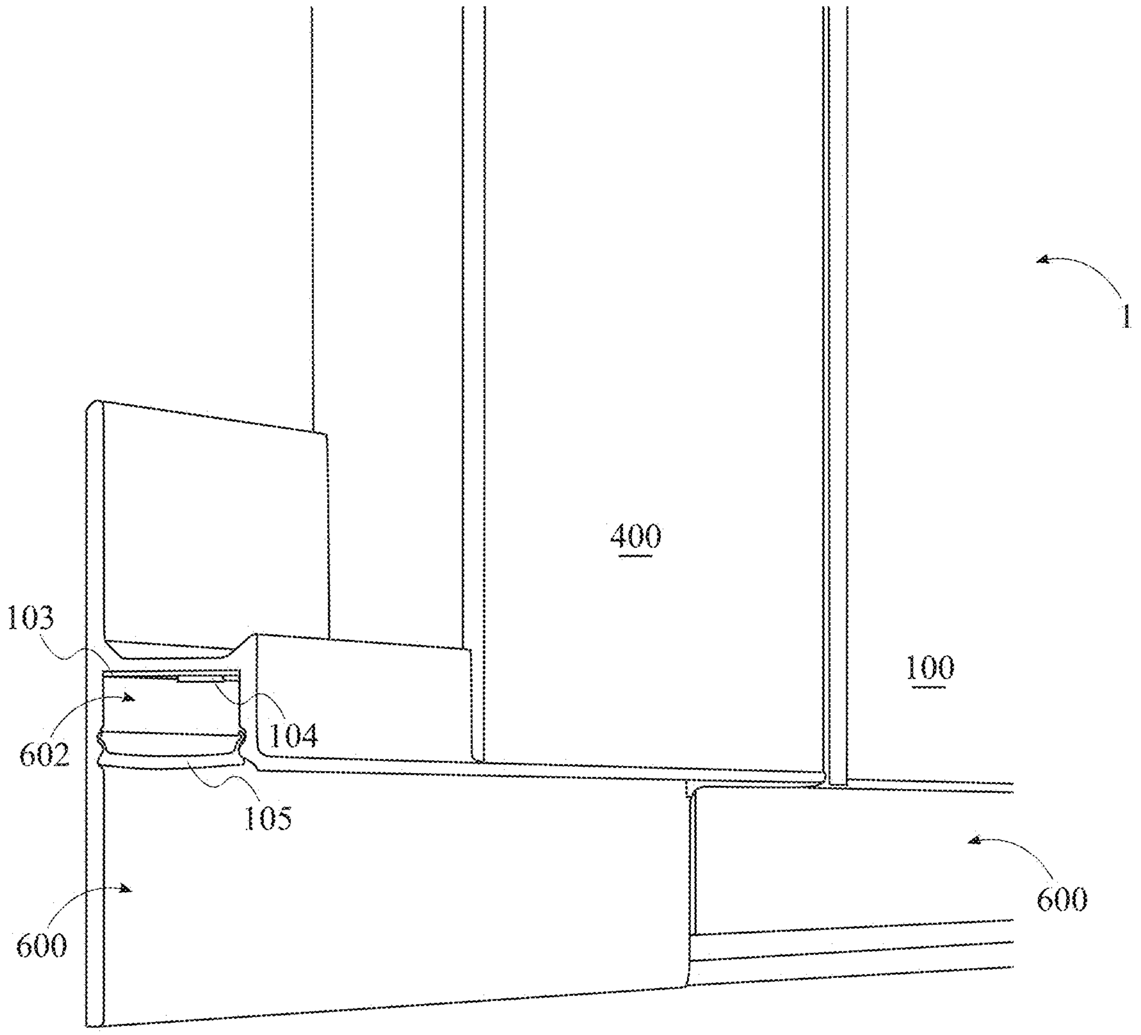
FIG. 8 is a perspective view of an alternate embodiment of the present invention comprising a profile member wherein a portion of the baseboard is cut away to expose the profile member.

In some embodiments of the present invention, as shown in FIG. 8, the lighting system 1 comprises a plurality of profile members 600 wherein one profile member 600 is coupled to the door 100 and another profile member 600 is coupled to the baseboard 400. In the context of the present invention, the profile member 600 comprises a body and a channel 602 wherein the body is coupled to either the door 100 or the baseboard 400, the channel 602 protruding outwardly from the body, horizontally traversing the body. In the preferred embodiment of the present invention, the channel 602 comprises a lighted strip 103, comprising a plurality of lights 104, traversing the channel 602. In the preferred embodiment of the present invention, the profile member 600 is embedded into the door 100 and the baseboard 400, as shown in FIG. 8. In some embodiments of the present invention, the channel 602 of the profile member 600 comprises a diffuser 105 beneath the lighted strip 103.

Figure 9:
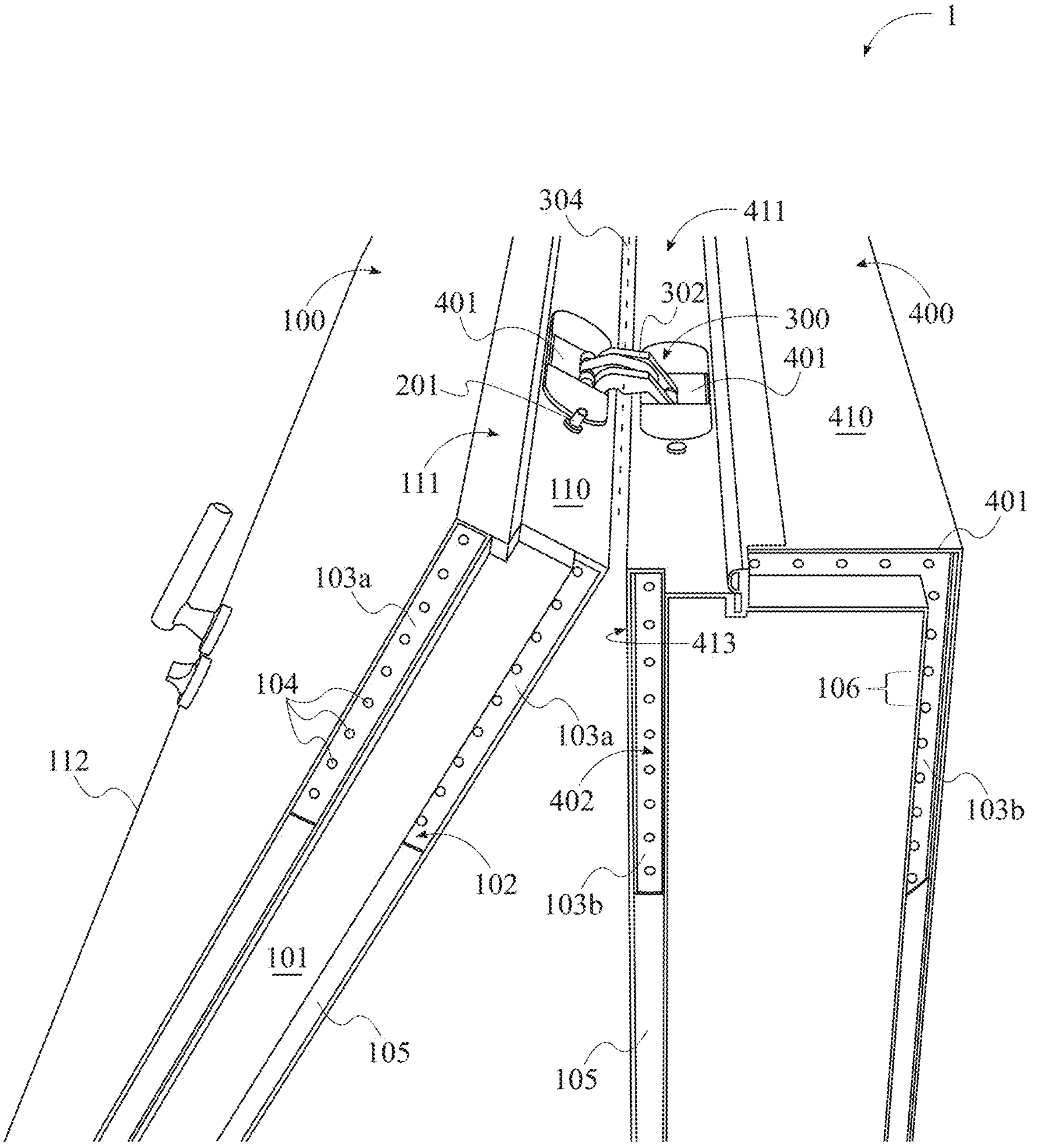
FIG. 9 is a bottom perspective view of the present invention showing an alternate embodiment.

In some embodiments of the present invention, as shown in FIG. 9, the conduit 200 is a spring-loaded conductive member 201, protruding from one of either: the proximal end 110 of the door 100 and the interior portion 410 of the baseboard 400. In such embodiments, the spring-loaded conductive member 201 engages a complimentary conductive plate of the complimentary components, thereby communicating electricity across said spring-loaded conductive member 201. In the context of the present invention, while in the open configuration, the spring-loaded conductive member 201 will be separated from the complimentary conductive plate, thereby maintaining an open circuit, only closing said circuit upon closure of the door 100. Furthermore, in some embodiments of the present invention, the hinge mechanism 300 may transfer electricity between the plurality of lighted strips 103. In such embodiments wherein the hinge mechanism 300 communicates electricity between the plurality of lighted strips 103, different hinge mechanism 300 may provide positive and negative nodes.

Although the invention has been explained in relation to its preferred embodiment, it is to be understood that many other possible modifications and variations can be made without departing from the spirit and scope of the invention.

What is claimed is:

1. A lighting system comprising:
- a door;
- a baseboard;
- a plurality of lighted strips;
- wherein:
  - the door comprises a distal edge and a channel;
  - the baseboard comprises an overhang and a door frame;
  - one lighted strip of the plurality of lighted strips traverses the channel of the door up to the distal edge of the door;
  - one lighted strip of the plurality of lighted strips traverses the overhang up to the door frame;
  - the door hinging about an axis relative to the baseboard, composing a closed configuration wherein the door is inset into the doorframe and colinear with an adjacent portion of the baseboard;
  - while in the closed configuration, the distal edge of the door is directly adjacent to the door frame of the base board, thus aligning the plurality of lighted strips colinearly whereby each of the plurality of lighted strips are immediately adjacent to each other.

2. The lighting system as claimed in claim 1, wherein the channel traverses a downwardly facing surface of the door.

3. The lighting system as claimed in claim 1, wherein the overhang comprises a channel, congruent to the channel of the door; wherein the respective lighted strip traversing the overhang, traverses the channel of the overhang.

4. The lighting system as claimed in claim 1, wherein:
- the door further comprises a proximal edge;
- the proximal edge hinges about the door frame;
- the proximal edge of the door and the door frame each comprise a cutout wherein said cutouts are complementary cutouts that engage with each other when the door is in the closed configuration.

5. The lighting system as claimed in claim 4 further comprising a hinge wherein aid hinge is coupled to the door and the door frame.

6. The lighting system as claimed in claim 5, wherein the hinge is a hidden hinge comprising:
- a hinge mechanism; and
- a cavity;
- wherein:
  - the hinge mechanism is interposedly coupled to the door and the door frame;
  - the cavity is composed of a recess within the door frame and a recess within the door;
  - the hinge mechanism being contained within the cavity;
  - the hinge mechanism being completely concealed within the cavity when in the closed configuration.

7. The lighting system, as claimed in claim 6, further comprising a conduit, wherein:
- the conduit is connected between the lighted strip traversing the channel of the door and the lighted strip traversing the overhang;
- the conduit is freely held between the proximal edge of the door and the door frame, whereby the conduit retracts into one of either: the door and the door frame; upon hinged motion; and
- the conduit communicating electricity between the plurality of lighted strips.

8. The lighting system as claimed in claim 1 wherein the plurality of lighted strips comprises a diffuser.

9. The lighting system, as claimed in claim 7 wherein the conduit communicates electricity from a power source.

10. A lighting system comprising:
- a door;
- a baseboard;
- a conduit; and
- a plurality of lighted strips;
- wherein:
  - the door comprises a distal edge and a channel;
  - the baseboard comprises an overhang and a door frame;
  - one lighted strip of the plurality of lighted strips traverses the channel of the door up to the distal edge of the door;
  - one lighted strip of the plurality of lighted strips traverses the overhang up to the door frame;
  - the conduit freely retractable within the door and the baseboard wherein the conduit connects to the lighted strip traversing the channel and to the lighted strip traversing the overhang;
  - the door hinging about an axis relative to the baseboard, composing a closed configuration wherein the door is inset into the doorframe and colinear with an adjacent portion of the baseboard;
  - while in the closed configuration, the distal edge of the door is directly adjacent to the door frame of the base board, thus aligning the plurality of lighted strips colinearly whereby each of the plurality of lighted strips are immediately adjacent to each other.

11. The lighting system as claimed in claim 10, wherein the channel traverses a downwardly facing surface of the door.

12. The lighting system as claimed in claim 11, wherein the overhang comprises a channel, congruent to the channel of the door; wherein the respective lighted strip traversing the overhang, traverses the channel of the overhang.

13. The lighting system as claimed in claim 12 wherein the door further comprises a proximal edge, wherein:
- the proximal edge hinges about the door frame; and
- the proximal edge of the door comprises a cutout.

14. The lighting system as claimed in claim 12 wherein the door frame further comprises a cutout, wherein:
- the cutout of the door frame is complementary to the cutout of the door; and
- the cutout of the door and the cutout of the door frame engage with each other when the door is in the closed configuration.

15. The lighting system as claimed in claim 14 further comprising a hinge wherein aid hinge is coupled to the door and the door frame.

16. The lighting system as claimed in claim 15, wherein the hinge is a hidden hinge comprising:
- a hinge mechanism; and
- a cavity;
- wherein:
  - the hinge mechanism is interposedly coupled to the door and the door frame;
  - the cavity is composed of a recess within the door frame and a recess within the door;
  - the hinge mechanism being contained within the cavity;
  - the hinge mechanism being completely concealed within the cavity when in the closed configuration.

17. The lighting system as claimed in claim 1 wherein the plurality of lighted strips comprises a diffuser.

18. A lighting system comprising:

a door;

a baseboard; and a plurality of profile members;

wherein:

each profile member of the plurality of profile members comprises:

a channel, wherein said channel comprises a lighted strip;

the lighted strip traverses the channel one of the profile members is coupled to a bottom-most portion of the door;

another profile member is coupled to a bottom-most portion of the baseboard;

the door hinging about an axis relative to the baseboard, composing a closed configuration wherein the door is colinear with an adjacent portion of the baseboard; and in the closed configuration, the plurality of profile members are colinearly adjacent to each other.

19. The lighting system, as claimed in claim 18, further comprising a conduit, wherein:

the conduit is connected between each lighted strip;

the conduit is freely retractable within the door and baseboard; and the conduit communicating electricity between the plurality of lighted strips.

20. The lighting system as claimed in claim 1 wherein the plurality of lighted strips comprises a diffuser.

* * * * *